United States Patent
Lee et al.

(10) Patent No.: US 10,986,690 B2
(45) Date of Patent: Apr. 20, 2021

(54) METHOD AND APPARATUS FOR CONFIGURING RRC CONNECTION ESTABLISHMENT CAUSE FOR RELAY TERMINAL IN IDLE STATE IN WIRELESS COMMUNICATION SYSTEM

(71) Applicant: LG ELECTRONICS INC., Seoul (KR)

(72) Inventors: Youngdae Lee, Seoul (KR); Jaewook Lee, Seoul (KR); Hanul Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 81 days.

(21) Appl. No.: 16/348,787

(22) PCT Filed: Nov. 10, 2017

(86) PCT No.: PCT/KR2017/012714
§ 371 (c)(1),
(2) Date: May 9, 2019

(87) PCT Pub. No.: WO2018/088832
PCT Pub. Date: May 17, 2018

(65) Prior Publication Data
US 2019/0268964 A1     Aug. 29, 2019

Related U.S. Application Data

(60) Provisional application No. 62/420,562, filed on Nov. 11, 2016.

(51) Int. Cl.
*H04W 76/27* (2018.01)
*H04W 76/14* (2018.01)
(Continued)

(52) U.S. Cl.
CPC .......... *H04W 76/27* (2018.02); *H04W 68/00* (2013.01); *H04W 76/14* (2018.02); *H04W 88/04* (2013.01); *H04W 92/18* (2013.01)

(58) Field of Classification Search
CPC ..... H04W 76/14; H04W 88/04; H04W 92/18; H04W 76/27; H04W 68/00
See application file for complete search history.

(56) References Cited

U.S. PATENT DOCUMENTS

| 10,531,365 B2 * | 1/2020 | Kaur | H04W 24/04 |
| 2013/0242866 A1 * | 9/2013 | Lin | H04B 7/26 |
| | | | 370/328 |

(Continued)

FOREIGN PATENT DOCUMENTS

| WO | 2015137631 A1 | 9/2015 |
| WO | 2016021922 A1 | 11/2016 |

OTHER PUBLICATIONS

3GPP TR 36.746., Technical Specification Group Radio Access Network, Study of further enhancements to LTE Device to Device (D2D), User Equipment (UE) to network relays for Internet of Things (IoT) and wearables; vol. 2.1 Oct. 2016, Valbonne, France.

(Continued)

*Primary Examiner* — Robert C Scheibel
(74) *Attorney, Agent, or Firm* — Dentons US LLP

(57) ABSTRACT

In the performance of a proximity-based services (ProSe) user equipment (UE)-to-network relay operation, when a remote UE needs to transmit control/user plane data to a network, a relay UE may be in a radio resource control (RRC) idle state. At this time, the relay UE receives an RRC connection establishment cause from the remote UE, and performs an RRC connection establishment procedure for the ProSe UE-to-network relay of the remote UE on the basis of the received RRC connection establishment cause.

13 Claims, 12 Drawing Sheets

(51) Int. Cl.
*H04W 88/04* (2009.01)
*H04W 92/18* (2009.01)
*H04W 68/00* (2009.01)

(56) References Cited

U.S. PATENT DOCUMENTS

2015/0327312 A1* 11/2015 Burbidge .............. H04W 76/14
370/329
2017/0317740 A1* 11/2017 Basu Mallick ... H04W 52/0229
2020/0120728 A1* 4/2020 Wallentin .............. H04W 80/02

OTHER PUBLICATIONS

Nokia et al., Connection establishment for UE-to-NW relaying, R2-168403, 3GPP TSG-RAN WG2 Meeting #96, Reno, USA, Nov. 14-18, 2016.
LG Electronics Inc., Discovery and connection establishment procedure, Discussion and Decision, R2-168779, 3GPP TSG-RAN WG2 Meeting #95bis, Reno, USA, Nov. 14-18, 2016.
3rd Generation Partnership Project, 3GPP TS 36.300, V14.0.0, Technical Specification Group Radio Access Network, Evolved Univeral Terrestrial Radio Access (E-UTRA), Radio Resource Control (RRC), Protocol specification, 3GPP TS 36.331, V14.0.0, Valbonne, France, Sep. 2016.
3rd Generation Partnership Project, 3GPP TS 36.331, V14.0.0, Technical Specification Group Radio Access Network, Evolved Universal Terrestrial Radio Access (E-UTRA), Radio Resource Control (RRC), Protocol specification, Valbonne, France, Sep. 2016.

* cited by examiner

METHOD AND APPARATUS FOR CONFIGURING RRC CONNECTION ESTABLISHMENT CAUSE FOR RELAY TERMINAL IN IDLE STATE IN WIRELESS COMMUNICATION SYSTEM

CROSS-REFERENCE TO RELATED APPLICATIONS

This application is the National Stage filing under 35 U.S.C. 371 of International Application No. PCT/KR2017/012714, filed on Nov. 10, 2017, which claims the benefit of U.S. Provisional Application No. 62/420,562 filed on Nov. 11, 2016, the contents of which are all hereby incorporated by reference herein in their entirety.

BACKGROUND OF THE INVENTION

Field of the Invention

The present invention relates to a wireless communication and, more particularly, to a method and apparatus for configuring radio resource control (RRC) connection establishment cause for a relay user equipment in an idle mode in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The research for the proximity-based service (ProSe) identifies use cases and scenarios which are available to be provided in a 3GPP LTE system based on adjacent user equipments (UEs). The identified scenarios include general and public safety services. The standard radio access network (RAN) task for activating the ProSe has been started with being focused on a public safety application in LTE Rel-12. In network coverage, discovery between devices and broadcast communication between devices are standardized in LTE Rel-12. In addition, in order to enable L3-based UE-to-network relay and the basic preferential processing mechanism and the like that reuse type 1 discovery and LTE Rel-12 D2D communication for partial and external network coverage scenario, the task for the public safety service has been continued in LTE Rel-13.

It is interested in connecting and managing machine-type communication (MTC) devices of low cost by using the LTE technique. One of the important examples of the low cost MTC device is a wearable device, and the wearable device has an advantage that it is always almost accessible to a smart phone which may play the role of a relay. It has been studied a method of applying the device-to-device (D2D) to such a device including non-3GPP short range technique. Particularly, in order to enable D2D support wearable and MTC application, the improvement of UE-to-network relay function is one of the aspects that need to be improved more in the LTE technique.

The ProSe UE-to-network relaying architecture does not distinguish the traffic of a relay UE and the traffic of a remote UE in an access layer. This model restricts the capability of treating the remote UE as a separate device by a network and an operator (i.e., for charge and security). Particularly, 3GPP security combining never reach end-to-end between a network and the remote UE, which means that the relay UE has a clear access to a communication of the remote UE. In order to support an end-to-end security through a relay link, a service continuity, an end-to-end (E2E) quality of service (QoS) for available case, an efficient operation with multiple remote UEs and an efficient path switch between Uu and D2D wireless interfaces, the UE-to-network relay needs to be improved. The relay using the D2D may also be based on a technique, not 3GPP such as Bluetooth and Wi-Fi. A few improvements such as the service continuity may make the relay for such technique be more fascinating in commercial use cases. This may be particularly useful in wearable owing to the use pattern proximate to a smart phone of a user as well as form factor limit (e.g., battery size limit) which makes the Uu connection be non-useful directly. This is particularly true in a deep coverage scenario. One of the cost-efficient methods of introducing relay is to use a uni-directional D2D link between a remote UE and a relay UE. In this case, the relay UE is used for relaying the uplink data from the remote UE only. The advantage of this method is that the additional radio frequency (RF) function for a D2D reception is not added to the remote UE.

It has been discussed various methods for improving the ProSe UE-to-network relay.

SUMMARY OF THE INVENTION

The present invention provides a method and apparatus for configuring radio resource control (RRC) connection establishment cause for a relay user equipment in an idle mode in a wireless communication system. The present invention provides a method and apparatus for performing an RRC connection establishment procedure by a relay user equipment based on the RRC connection establishment cause received from a remote user equipment for proximity-based services (ProSe) UE-to-network relay.

In an aspect, a method for performing a radio resource control (RRC) connection establishment procedure performed by a relay user equipment (UE) in a wireless communication system is provided. The method includes entering an RRC idle (RRC_IDLE) state, receiving an RRC connection establishment cause from a remote UE, and performing the RRC connection establishment procedure for proximity-based services (ProSe) UE-to-network relay of the remote UE based on the received RRC connection establishment cause.

In another aspect, a relay user equipment (UE) in a wireless communication system is provided. The relay UE includes a memory, a transceiver, and a processor connected with the memory and the transceiver. The processor is configured to enter a radio resource control (RRC) idle (RRC_IDLE) state, control the transceiver to receive an RRC connection establishment cause from a remote UE, and perform the RRC connection establishment procedure for proximity-based services (ProSe) UE-to-network relay of the remote UE based on the received RRC connection establishment cause.

The proximity-based services (ProSe) UE-to-network relay can be performed efficiently.

DESCRIPTION OF EXEMPLARY EMBODIMENTS

Figure 1:
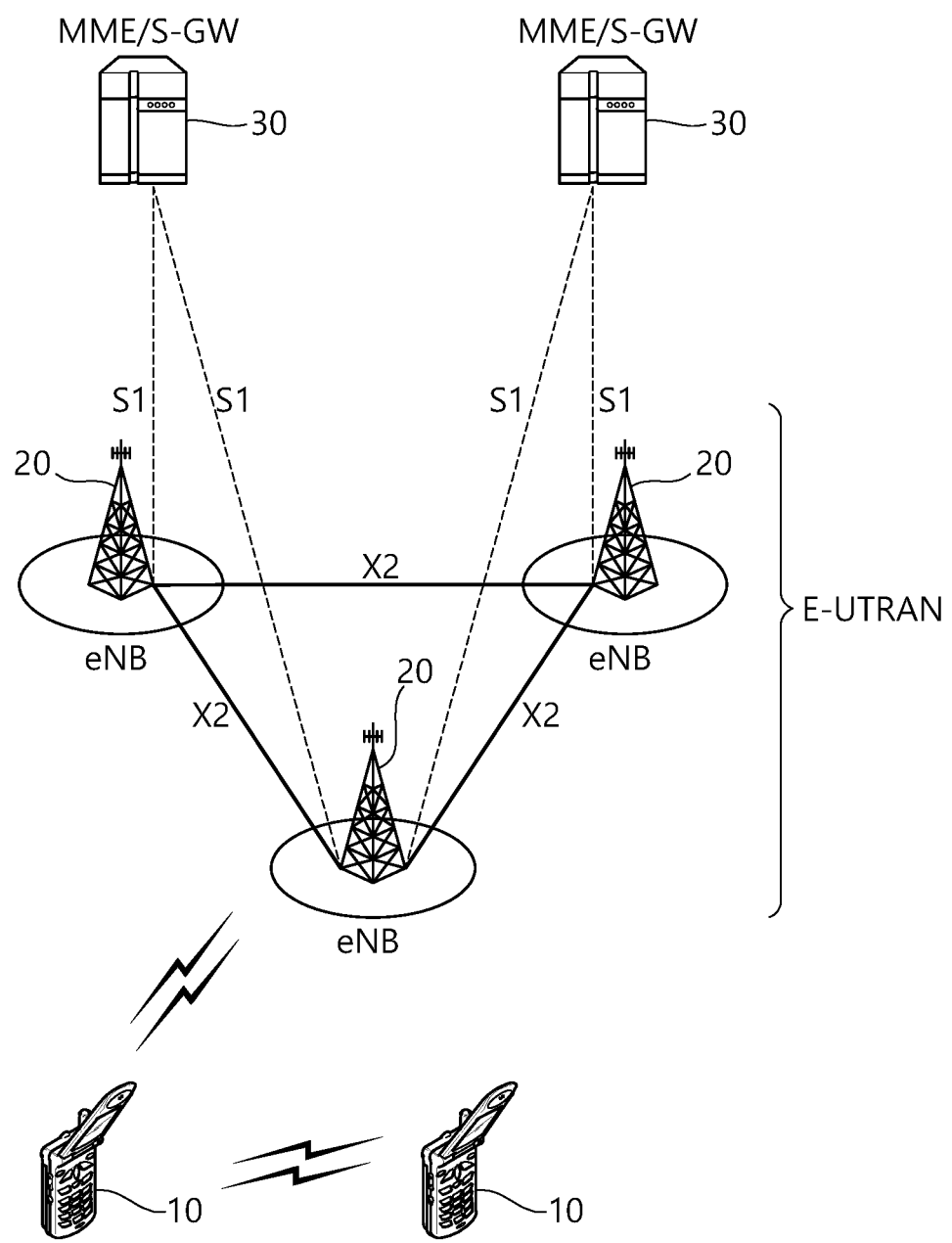
FIG. 1 shows 3GPP LTE system architecture.

FIG. 1 shows 3GPP LTE system architecture. Referring to FIG. 1, the 3GPP long-term evolution (LTE) system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an S1 interface.

Figure 2:
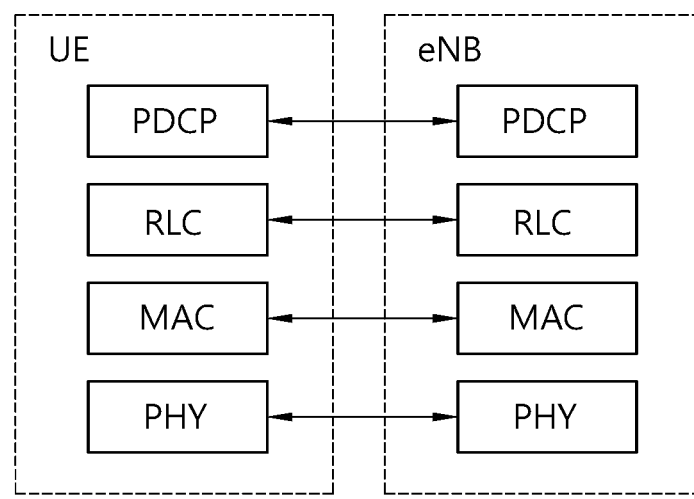
FIG. 2 shows a block diagram of a user plane protocol stack of an LTE system.
Figure 3:
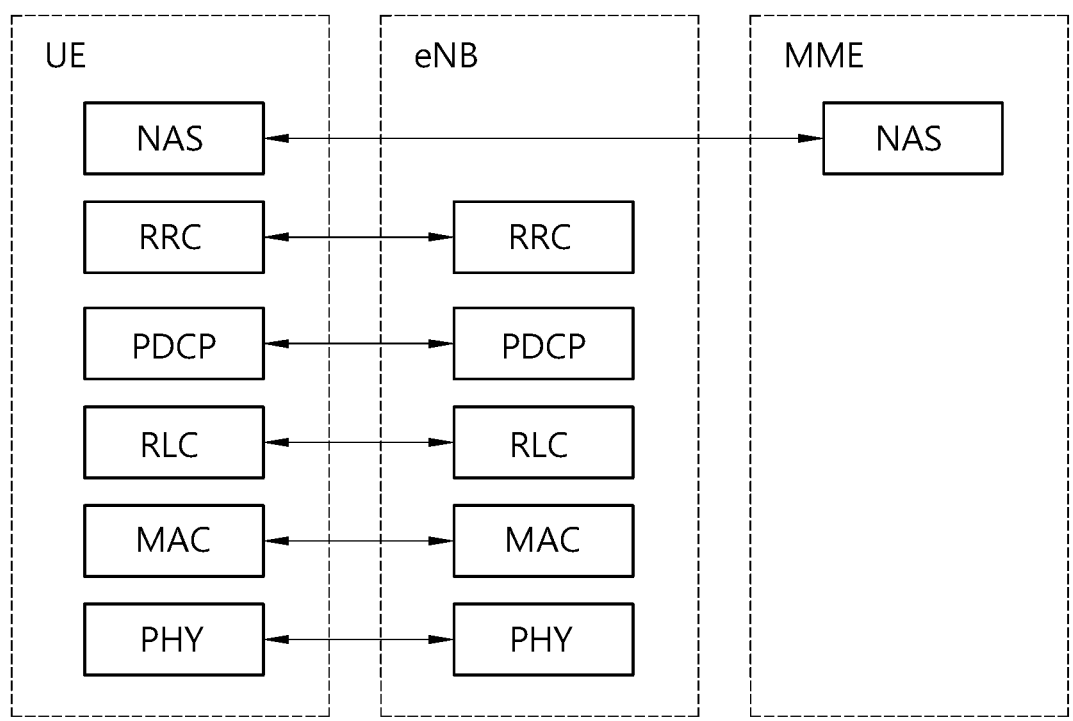
FIG. 3 shows a block diagram of a control plane protocol stack of an LTE system.

FIG. 2 shows a block diagram of a user plane protocol stack of an LTE system. FIG. 3 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RRC layer is located at the lowest portion of the L3, and is only defined in the control plane. The RRC layer controls logical channels, transport channels, and physical channels in relation to the 30 configuration, reconfiguration, and release of radio bearers (RBs). The RB signifies a service provided the L2 for data transmission between the UE and E-UTRAN.

Referring to FIG. 2, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 3, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, and an uplink shared channel (UL-SCH) for transmitting user traffic or control signals. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both UL and DL. The MTCH is a point-to-multipoint downlink channel for transmitting traffic data from the network to the UE.

UL connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Sidelink is described. Sidelink is a UE to UE interface for sidelink communication and sidelink discovery. The Sidelink corresponds to the PC5 interface. Sidelink communication is AS functionality enabling proximity-based services (ProSe) direct communication, between two or more nearby UEs, using E-UTRA technology but not traversing any network node. Sidelink discovery is AS functionality enabling ProSe direct discovery, using E-UTRA technology but not traversing any network node.

Sidelink physical channels include a physical sidelink broadcast channel (PSBCH) carrying system and synchronization related information, transmitted from the UE, a physical sidelink discovery channel (PSDCH) carrying sidelink discovery message from the UE, a physical sidelink control channel (PSCCH) carrying control from a UE for sidelink communication, and a physical sidelink shared channel (PSSCH) carrying data from a UE for sidelink communication. The sidelink physical channels are mapped to sidelink transport channels. The PSBCH is mapped to a sidelink broadcast channel (SL-BCH). The PSDCH is mapped to a sidelink discovery channel (SL-DCH). The PSSCH is mapped to a sidelink shared channel (SL-SCH).

In sidelink, the logical channels are also classified into control channels for transferring control plane information and traffic channels for transferring user plane information. The sidelink control channels include a sidelink broadcast control channel (SBCCH) which is a sidelink channel for broadcasting sidelink system information from one UE to other UE(s). The SBCCH is mapped to the SL-BCH. The sidelink traffic channels include a sidelink traffic channel (STCH) which is a point-to-multipoint channel, for transfer of user information from one UE to other UE(s). The STCH is mapped to the SL-SCH. This channel is used only by sidelink communication capable UEs.

Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication.

The UE supporting sidelink communication can operate in the following two modes for resource allocation. The first mode is a scheduled resource allocation. The scheduled resource allocation may be called Mode 1. In mode 1, the UE needs to be RRC_CONNECTED in order to transmit data. The UE requests transmission resources from the eNB. The eNB schedules transmission resources for transmission of sidelink control information (SCI) and data. The UE sends a scheduling request (dedicated scheduling request (D-SR) or random access) to the eNB followed by a sidelink buffer status report (BSR). Based on the Sidelink BSR, the eNB can determine that the UE has data for a sidelink communication transmission and estimate the resources needed for transmission. The eNB can schedule transmission resources for sidelink communication using configured sidelink radio network temporary identity (SL-RNTI).

The second mode is a UE autonomous resource allocation. The UE autonomous resource allocation may be called Mode 2. In mode 2, a UE on its own selects resources from resource pools and performs transport format selection to transmit sidelink control information and data. There can be up to 8 transmission pools either pre-configured for out of coverage operation or provided by RRC signaling for in-coverage operation. Each pool can have one or more Prose per-packet priority (PPPP) associated with it. For transmission of a MAC protocol data unit (PDU), the UE selects a transmission pool in which one of the associated PPPP is equal to the PPPP of a logical channel with highest PPPP among the logical channel identified in the MAC PDU. There is a one to one association between sidelink control pool and sidelink data pool. Once the resource pool is selected, the selection is valid for the entire sidelink control period. After the sidelink control period is finished, the UE may perform resource pool selection again.

A UE is considered in-coverage for sidelink communication whenever it detects a cell on a public safety ProSe carrier. If the UE is out of coverage for sidelink communication, it can only use Mode 2. If the UE is in coverage for sidelink communication, it may use Mode 1 or Mode 2 as per eNB configuration. If the UE is in coverage for sidelink communication, it shall use only the resource allocation mode indicated by eNB configuration unless one of the exceptional cases occurs. When an exceptional case occurs, the UE is allowed to use Mode 2 temporarily even though it was configured to use Mode 1. Resource pool to be used during exceptional case may be provided by eNB.

The cell on the public safety ProSe carrier may select one of the following two options. First, the cell on the public safety ProSe carrier may provide a transmission resource pool for Mode 2 in SIB18. UEs that are authorized for sidelink communication may use these resources for sidelink communication in RRC_IDLE in the cell on the same carrier (i.e. public safety ProSe carrier). UEs that are authorized for sidelink communication may use these resources for sidelink communication in RRC_IDLE or RRC_CONNECTED in a cell on another carrier.

Alternatively, the cell on the public safety ProSe carrier may indicate in SIB18 that it supports sidelink communication but does not provide transmission resources. UEs need to enter RRC_CONNECTED to perform sidelink communication transmission. In this case the cell on the public safety ProSe carrier may provide in broadcast signaling an exceptional transmission resource pool for Mode 2, to be used by the UE in exceptional cases. A UE in RRC_CONNECTED that is authorized to perform sidelink communication transmission indicates to the serving eNB that it wants to perform sidelink communication transmissions. The eNB validates whether the UE is authorized for sidelink communication transmission using the UE context received from MME. The eNB may configure a UE by dedicated signaling with a transmission resource pool for Mode 2 that may be used without constraints while the UE is in RRC_CONNECTED. Alternatively, the eNB may configure a UE to use the exceptional transmission resource pool for Mode 2 which the UE is allowed to use only in exceptional cases, and rely on Mode 1 otherwise.

A set of transmission and reception resource pools for sidelink control information when the UE is out of coverage for sidelink communication is pre-configured in the UE. The resource pools for sidelink control information when the UE is in coverage for sidelink communication are configured as below. The resource pools used for reception are configured by the eNB via RRC, in broadcast signaling. The resource pool used for transmission is configured by the eNB via RRC, in dedicated or broadcast signaling, if Mode 2 is used. The resource pool used for transmission is configured by the eNB via RRC, in dedicated signaling if Mode 1 is used. The eNB schedules the specific resource(s) for sidelink control information transmission within the configured reception pools.

A set of transmission and reception resource pools for data when the UE is out of coverage for sidelink communication is pre-configured in the UE. The resource pools for data when the UE is in coverage for sidelink communication are configured as below. The resource pools used for transmission and reception are configured by the eNB via RRC, in dedicated or broadcast signaling, if Mode 2 is used. There is no resource pool for transmission and reception if Mode 1 is used.

Sidelink discovery is defined as the procedure used by the UE supporting sidelink discovery to discover other UE(s) in its proximity, using E-UTRA direct radio signals via PC5. Sidelink discovery is supported both when UE is served by EUTRAN and when UE is out of EUTRA coverage. Only ProSe-enabled public safety UE can perform sidelink discovery when it is out of EUTRA coverage. For public safety sidelink discovery, the allowed frequency is pre-configured in the UE, and is used even when UE is out of coverage of E-UTRA in that frequency. The pre-configured frequency is the same frequency as the public safety ProSe carrier.

There are two types of resource allocation for discovery message announcement. The first type is a UE autonomous resource selection, which is a resource allocation procedure where resources for announcing of discovery message are allocated on a non UE specific basis. The UE autonomous resource selection may be called Type 1. In Type 1, the eNB provides the UE(s) with the resource pool configuration used for announcing of discovery message. The configuration may be signaled in broadcast or dedicated signaling. The UE autonomously selects radio resource(s) from the indicated resource pool and announces discovery message. The UE can announce discovery message on a randomly selected discovery resource during each discovery period.

The second is a scheduled resource allocation, which is a resource allocation procedure where resources for announcing of discovery message are allocated on per UE specific basis. The scheduled resource allocation may be called Type 2. In Type 2, the UE in RRC_CONNECTED may request resource(s) for announcing of discovery message from the eNB via RRC. The eNB assigns resource(s) via RRC. The resources are allocated within the resource pool that is configured in UEs for announcement.

For UEs in RRC_IDLE, the eNB may select one of the following options. The eNB may provide resource pools for Type 1 based discovery message announcement in SIB19. UEs that are authorized for sidelink discovery use these resources for announcing discovery message in RRC_IDLE. Or, the eNB may indicate in SIB19 that it supports sidelink discovery but does not provide resources for discovery message announcement. UEs need to enter RRC_CONNECTED in order to request resources for discovery message announcement.

For UEs in RRC_CONNECTED, a UE authorized to perform sidelink discovery announcement indicates to the eNB that it wants to perform sidelink discovery announcement. A UE can also indicate to the eNB the frequency(s) in which sidelink discovery announcement is desired. The eNB validates whether the UE is authorized for sidelink discovery announcement using the UE context received from MME. The eNB may configure the UE with resource pool for Type 1 for discovery message announcement via dedicated signaling. The eNB may configure resource pool along with dedicated resource in the form of time and frequency indices for discovery message announcement via dedicated RRC signaling. The resources allocated by the eNB via dedicated signaling are valid until the eNB re-configures the resource(s) by RRC signaling or, the UE enters RRC_IDLE.

Authorized receiving UEs in RRC_IDLE and RRC_CONNECTED monitor resource pools used for Type 1 and resource pools for Type 2. The eNB provides the resource pool configuration used for discovery message monitoring on intra frequency, inter frequency of same or different PLMNs cells in RRC signaling (SIB19). The RRC signaling (SIB19 or dedicated) may contain detailed sidelink discovery configuration used for announcement of sidelink discovery in cells of intra-frequency, inter-frequency of same or different PLMNs.

RRC connection establishment procedure is described. It may be referred to as Section 5.3.3.1 of 3GPP TS 36.331 V14.0.0 (2016-09). The purpose of this procedure is to establish or resume an RRC connection. RRC connection establishment involves signaling radio bearer type 1 (SRB1) establishment. In addition, RRC connection establishment involves SRB1 bis establishment for narrowband internet-of-things (NB-IoT). The procedure is also used to transfer the initial NAS dedicated information/message from the UE to E-UTRAN. When establishing an RRC connection, E-UTRAN applies the procedure to establish SRB1 and, for NB-IoT, SRB1bis. When resuming an RRC connection, E-UTRAN applies the procedure to restore the AS configuration from a stored context including resuming SRB(s) and data radio bearer(s) (DRB(s)).

Figure 4:
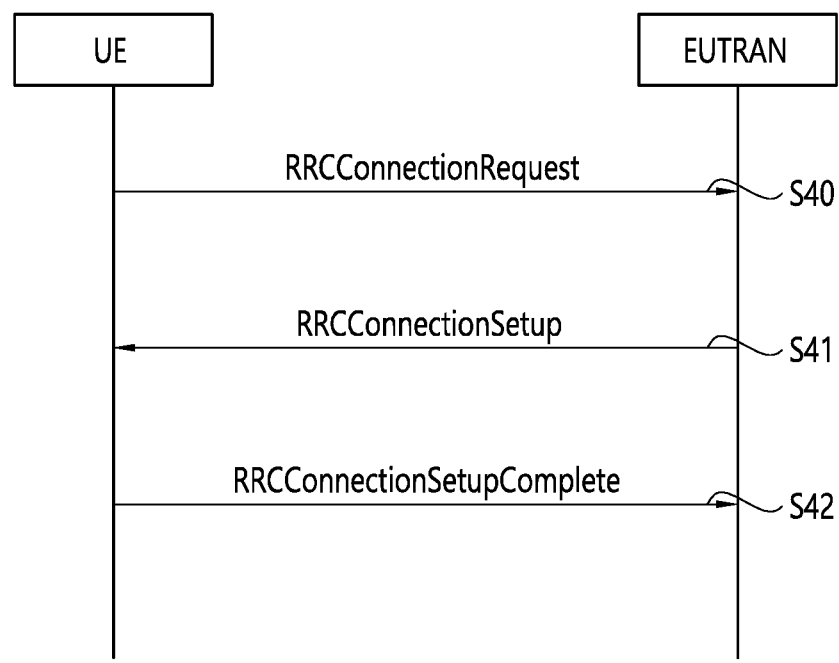
FIG. 4 shows an RRC connection establishment procedure.

FIG. 4 shows an RRC connection establishment procedure. Referring to FIG. 4, in step S40, the UE transmits an RRC connection request message ("RRCConnectionRequst") to the E-UTRAN. The RRCConnectionRequest message is used to request the establishment of an RRC connection. The RRCConnectionRequest message is transmitted via a logical channel CCCH. Table 1 shows an example of the RRCConnectionRequest message.

TABLE 1

```
-- ASN1START
RRCConnectionRequest ::=   SEQUENCE {
    criticalExtensions              CHOICE {
        rrcConnectionRequest-r8            RRCConnectionRequest-r8-IEs,
        criticalExtensionsFuture           SEQUENCE { }
    }
}
RRCConnectionRequest-r8-IEs ::=                SEQUENCE {
    ue-Identity                     InitialUE-Identity,
    establishmentCause              EstablishmentCause,
    spare                           BIT STRING (SIZE (1))
}
InitialUE-Identity ::= CHOICE {
    s-TMSI                          S-TMSI,
    randomValue                     BIT STRING (SIZE (40))
}
EstablishmentCause ::= ENUMERATED {
                                    emergency, highPriorityAccess, mt-Access, mo-Signalling,
                                    mo-Data, delayTolerantAccess-v1020, mo-VoiceCall-v1280,
spare1}
-- ASN1STOP
```

Referring to Table 1, the RRCConnectionRequest message includes an establishment cause field ("establishmentCause"). The establishment cause field provides the establishment cause for the RRC connection request as provided by the upper layers. In the establishment cause field, "highPriorityAccess" value concerns access class (AC)11 to AC15. In the establishment cause field, 'mt' stands for 'mobile terminating' and 'mo' for 'mobile originating'. eNB is not expected to reject a RRCConnectionRequest due to unknown cause value being used by the UE.

In step S41, the E-UTRAN transmits an RRC connection setup message ("RRCConnectionSetup") to the E-UTRAN. The RRCConnectionSetup message is used to establish SRB1. In step S42, the UE transmits an RRC connection setup complete message ("RRCConnectionSetupComplete") to the E-UTRAN. The RRCConnectionSetupComplete message is used to confirm the successful completion of an RRC connection establishment.

Sidelink communication via ProSe UE-to-network relay is described. It may be referred to as Section 23.10.4 of 3GPP TS 36.300 V14.0.0 (2016-09). A ProSe UE-to-network relay provides a generic L3 forwarding function that can relay any type of IP traffic between the remote UE and the network. One-to-one and one-to-many sidelink communications are used between the remote UE(s) and the relay UE. For both remote UE and relay UE, only one single carrier (i.e. public safety ProSe carrier) operation is supported (i.e. Uu and PC5 should be same carrier for relay/remote UE). The remote UE is authorized by upper layers and can be in-coverage of the public safety ProSe carrier or out-of-coverage on any supported carriers including public safety ProSe carrier for UE-to-network relay discovery, (re)selection and communication. The relay UE is always in-coverage of EUTRAN. The relay UE and the remote UE perform sidelink communication and sidelink discovery.

The eNB controls whether the UE can act as a ProSe UE-to-network relay. If the eNB broadcast any information associated to ProSe UE-to-network relay operation, then ProSe UE-to-network relay operation is supported in the cell. The eNB may provide Transmission resources for ProSe UE-to-network relay discovery using broadcast signaling for RRC_IDLE and dedicated signaling for RRC_CONNECTED, reception resources for ProSe UE-to-network relay discovery using broadcast signaling. In addition, the eNB may broadcasts a minimum and/or a maximum Uu link quality (i.e. reference signal received power (RSRP)) threshold(s) that the UE needs to respect before it can initiate a UE-to-network relay discovery procedure. In RRC_IDLE, when the eNB broadcasts transmission resource pools, the UE uses the threshold(s) to autonomously start or stop the UE-to-network relay discovery procedure. In RRC_CONNECTED, the UE uses the threshold(s) to determine if it can indicate to eNB that it is a relay UE and wants to start ProSe UE-to-network relay discovery. If the eNB does not broadcast transmission resource pools for ProSe-UE-to-network relay discovery, then a UE can initiate a request for ProSeUE-to-network relay discovery resources by dedicated signaling, respecting these broadcasted threshold(s). If the ProSe-UE-to-network relay is initiated by broadcast signaling, the relay UE can perform ProSe UE-to-network relay discovery when in RRC_IDLE. If the ProSe UE-to-network relay is initiated by dedicated signaling, the relay UE can perform relay discovery as long as it is in RRC_CONNECTED.

A relay UE performing sidelink communication for ProSe UE-to-network relay operation has to be in RRC_CONNECTED. After receiving a layer-2 link establishment request or temporary mobile group identity (TMGI) monitoring request (upper layer message) from the remote UE, the relay UE indicates to the eNB that it is a relay UE and intends to perform ProSe UE-to-network relay sidelink communication. The eNB may provide resources for ProSe UE-to-network relay communication.

The remote UE can decide when to start monitoring for ProSe UE-to-network relay discovery. The remote UE can transmit ProSe UE-to-network relay discovery solicitation messages while in RRC_IDLE or in RRC_CONNECTED depending on the configuration of resources for ProSe UE-to-network relay discovery. The eNB may broadcast a threshold, which is used by the remote UE to determine if it can transmit ProSe UE-to-network relay discovery solicitation messages, to connect or communicate with the relay UE. The RRC_CONNECTED remote UE, uses the broadcasted threshold to determine if it can indicate to eNB that it is a remote UE and wants to participate in ProSe UE-to-network relay discovery and/or communication. The eNB may provide, transmission resources using broadcast or dedicated signaling and reception resources using broadcast signaling for ProSe UE-to-network relay operation. The remote UE stops using ProSe UE-to-network relay discovery and communication resources when RSRP goes above the broadcasted threshold. Exact time of traffic switching from Uu to PC5 or vice versa is up to higher layer.

The remote UE performs radio measurements at PC5 interface and uses them for ProSe UE-to-network relay selection and reselection along with higher layer criterion. A ProSe UE-to-network relay is considered suitable in terms of radio criteria if the PC5 link quality exceeds configured threshold (pre-configured or provided by eNB). The remote UE selects the relay UE, which satisfies higher layer criterion and has best PC5 link quality among all suitable relay UEs.

The remote UE triggers ProSe UE-to-network relay reselection when:
  PC5 signal strength of current relay UE is below configured signal strength threshold;
  It receives a layer-2 link release message (upper layer message) [62] from the relay UE.

Figure 5:
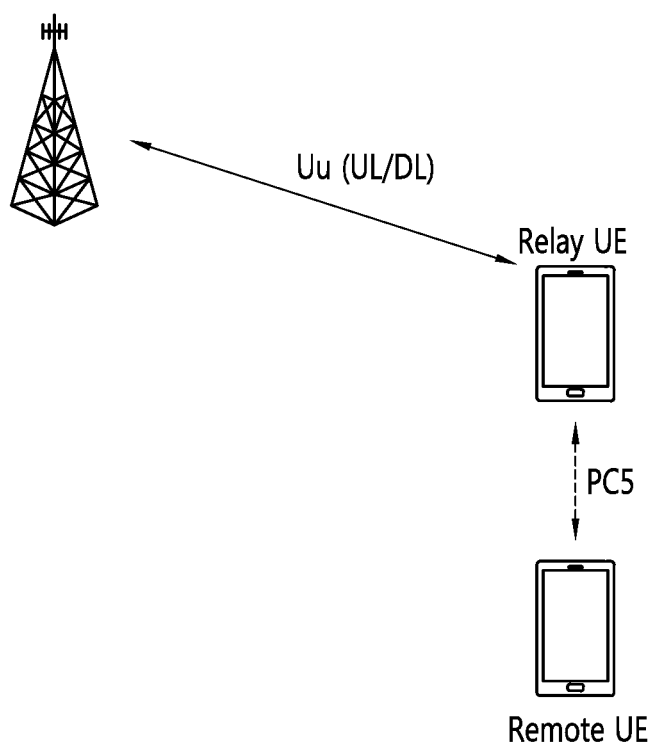
FIG. 5 illustrates an example of bi-directional UE-to-network relay.

FIG. 5 illustrates an example of bi-directional UE-to-network relay. Referring to FIG. 5, a relay UE is used for relaying UE-specific data from a remote UE in UL or used for relaying UE-specific data to the remote UE in DL. According to a bi-directional D2D link between the remote UE and the relay UE, large scale transmission time interval (TTI) bundle may be completely removed from both of UL and DL. The remote UE is requested to receive SIB and paging from an eNB directly. In order to support it in a form of relay, the remote UE needs to have both of D2D transmission and reception capabilities together with Uu reception capability.

Figure 6:
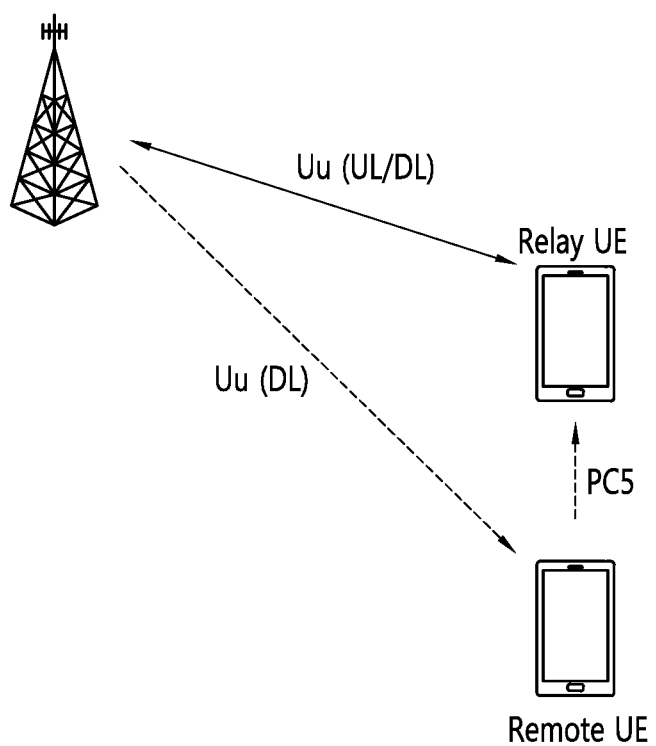
FIG. 6 illustrates an example of unidirectional UE-to-network relay.

FIG. 6 illustrates an example of unidirectional UE-to-network relay. Referring to FIG. 6, a relay UE is used for relaying UL data only from a remote UE. Owing to this limitation, large scale TTI bundle may be removed from UL only. However, the D2D transmission capability is free of charge since the same transmission chain is used in both of Uu and D2D, and accordingly, there is an advantage that it has low cast like in the enhanced MTC (eMTC). Rel-13 ProSe UE-to-network relay is layer 3 relay, and may be improved to layer 2 relay in order to help an eNB. Another advantage of the unidirectional relay is that the relay UE does not undergo the half duplex problem of PC5 interface.

That is, in some cases, the remote UE may have the D2D transmission capability or both of transmission/reception capabilities, but the relay UE may be a normal UE that has the D2D transmission/reception capability and the Uu transmission/reception capability.

According to the conventional art, when a remote UE triggers a communication to a network through the ProSe UE-to-network relay, there is no consideration on which way a relay UE in RRC_IDLE configures an RRC connection establishment cause. In order to solve such a problem, the present invention provides a method for a relay UE to configure an RRC connection establishment cause in the process of performing an RRC connection establishment procedure with a network for the ProSe UE-to-network relay.

In the description below, it is assumed that sidelink is connected/established between a relay UE and a remote UE. The sidelink technique may include non-3GPP access (e.g. Wi-Fi/Bluetooth) as well as LTE Sidelink. In addition, in the description below, it is assumed that the relay UE is in RRC_IDLE. Furthermore, in the description below, it is assumed that the remote UE needs to transmit control plane or user plane data to the network through the ProSe UE-to-network relay.

When the remote UE request a data transmission to the relay UE in RRC_IDLE, the relay UE needs to establish an RRC connection with the network. Particularly, the RRC connection establishment of the relay UE may be triggered by one of the following events.

When the relay UE receives a connection establishment request message for a connection establishment between the remote UE and the relay UE from the remote UE;

When the relay UE receives random control plane or user plane data from the connected remote UE (in this case, it is assumed that sidelink is connected/established between the relay UE and the remote UE).

Hereinafter, according to various embodiments of the present invention, it is described a method for a relay UE to configure an RRC connection establishment cause for the ProSe UE-to-network relay.

1. Method 1

According to method 1, a relay UE may configure an RRC connection establishment cause based on a cause value received from a remote UE, and perform an RRC connection establishment procedure with a network. That is, the remote UE may transmit its own cause value of an RRC connection and the relay UE may configure a cause value of an RRC connection request message based on the cause value received from the remote UE.

Figure 7:
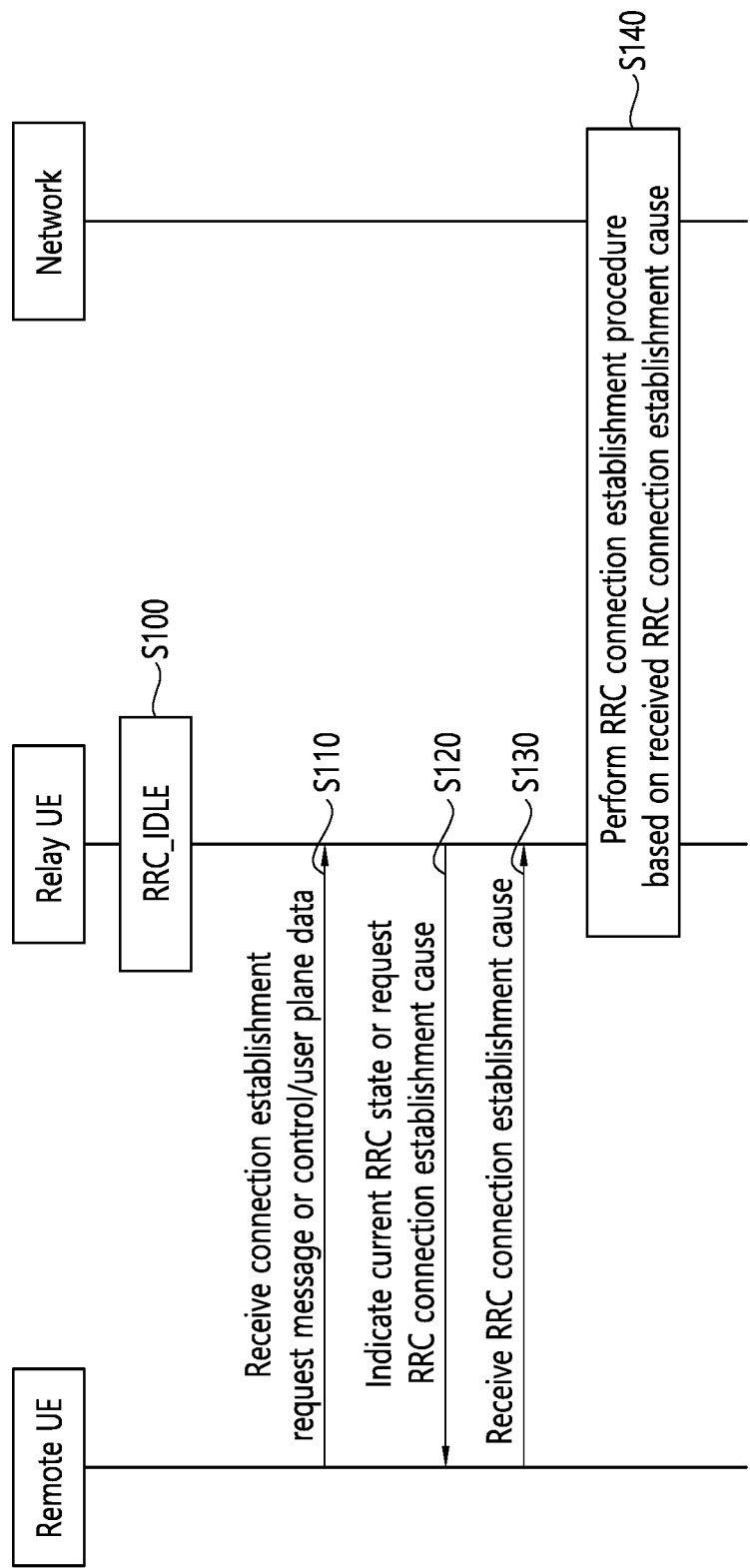
FIG. 7 illustrates a method for configuring an RRC connection establishment cause according to an embodiment of the present invention.

FIG. 7 illustrates a method for configuring an RRC connection establishment cause according to an embodiment of the present invention.

In step S100, a relay UE is in RRC_IDLE. In step S110, the relay UE receives an RRC connection request message for a connection establishment between a remote UE and the relay UE, or receives random control plane or user plane data from the remote UE. That is, for the ProSe UE-to-network relay, an RRC connection establishment procedure with a network is triggered.

The relay UE that receives a connection establishment request message or control/user plane data from the remote UE indicates a current RRC state to the remote UE or transmits a RRC connection establishment cause request to the remote UE, in step S120.

The remote UE that receives the current RRC state of the relay UE or the RRC connection establishment cause request from the relay UE transmits the RRC connection establishment cause to the relay UE in response to it, in step S130.

The RRC connection establishment cause may be one of the cause values defined in Table 1 (e.g., mo-signalling, mo-data, etc.).

The relay UE that receives the RRC connection establishment cause from the remote UE performs the RRC connection establishment procedure with the network based on the RRC connection establishment cause which is received in step S140.

Figure 8:
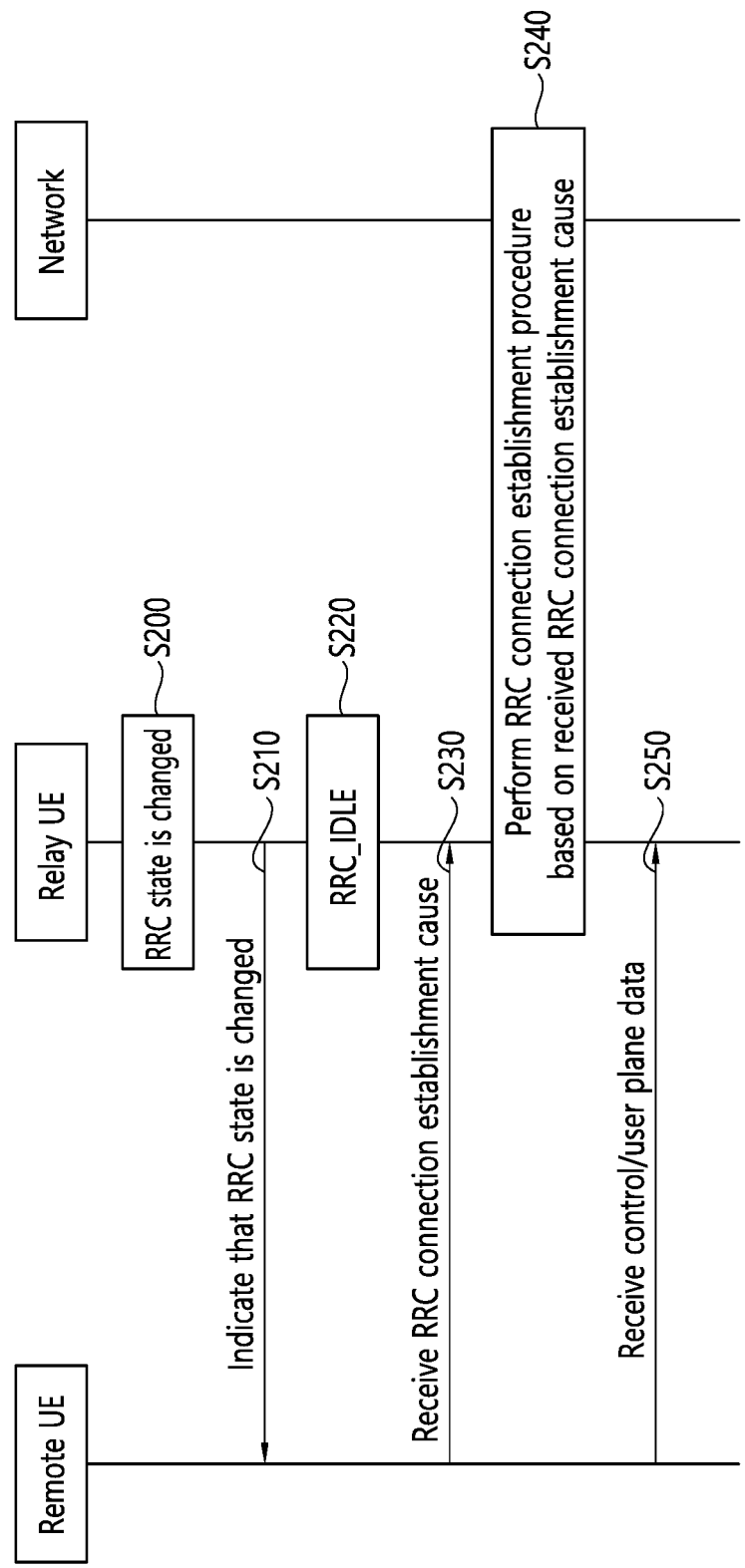
FIG. 8 illustrates a method for configuring an RRC connection establishment cause according to another embodiment of the present invention.

FIG. 8 illustrates a method for configuring an RRC connection establishment cause according to another embodiment of the present invention.

In step S200, an RRC state of a relay UE is changed. When the RRC state of the relay UE is changed, in step S210, the relay UE informs that the RRC state is changed to a remote UE. In step S220, the relay UE enters RRC_IDLE.

In the case that the relay UE is in RRC_IDLE and the remote UE knows such an RRC state of the relay UE, before the remote UE requests data transmission and reception for sidelink or transmits an RRC connection request message, in step S230, the remote UE transmits an RRC connection establishment cause to the relay UE. The RRC connection establishment cause may be one of the cause values defined in Table 1 (e.g., mo-signalling, mo-data, etc.).

The relay UE that receives the RRC connection establishment cause from the remote UE performs the RRC connection establishment procedure with a network based on the RRC connection establishment cause which is received in step S240. Later, in step S250, the remote UE transmits control plane or user plane data to the relay UE.

Figure 9:
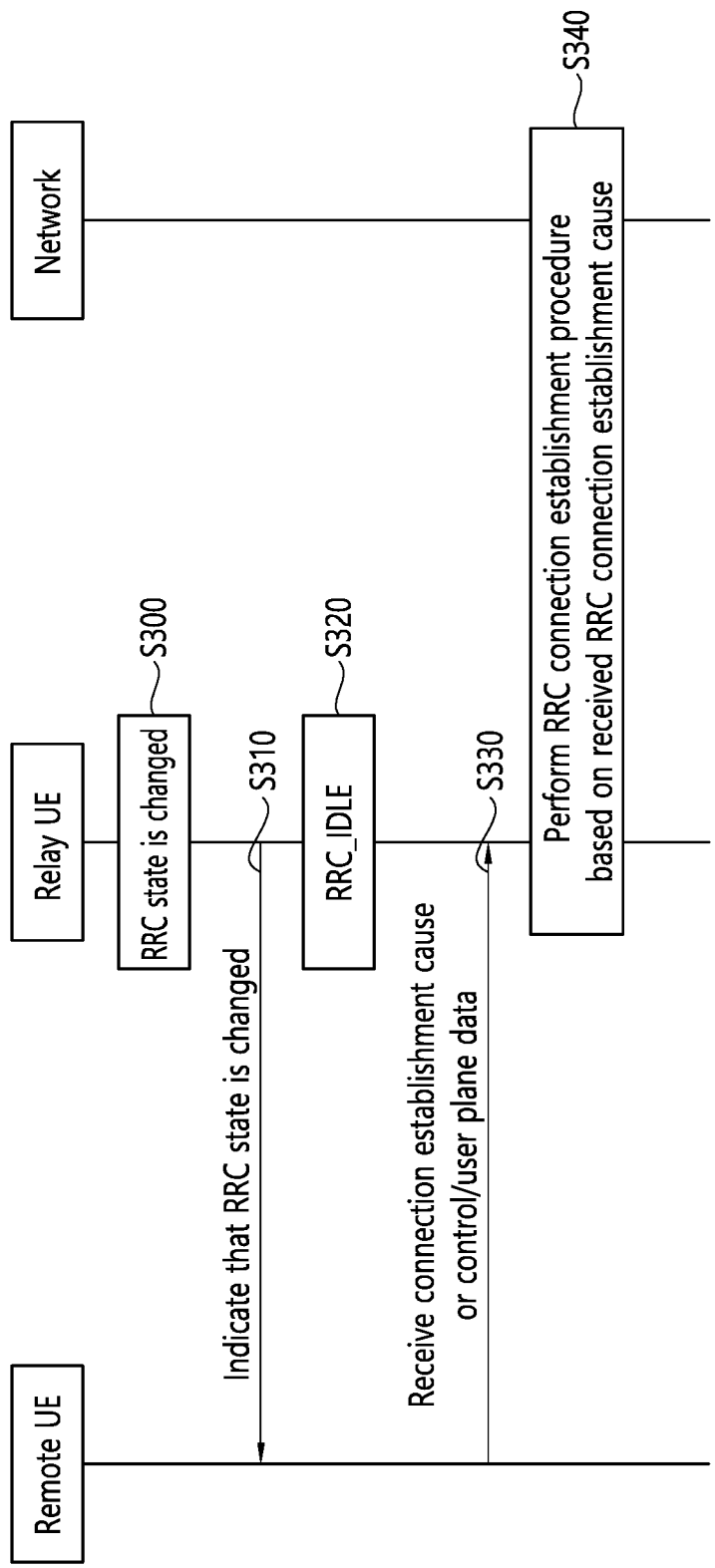
FIG. 9 illustrates a method for configuring an RRC connection establishment cause according to another embodiment of the present invention.

FIG. 9 illustrates a method for configuring an RRC connection establishment cause according to another embodiment of the present invention.

In step S300, an RRC state of a relay UE is changed. When the RRC state of the relay UE is changed, in step S310, the relay UE informs that the RRC state is changed to a remote UE. In step S320, the relay UE enters RRC_IDLE.

In the case that the relay UE is in RRC_IDLE and the remote UE knows such an RRC state of the relay UE, in step S330, the remote UE requests data transmission and reception for sidelink or transmits an RRC connection request message, and simultaneously, the remote UE transmits an RRC connection establishment cause to the relay UE. The RRC connection establishment cause may be one of the cause values defined in Table 1 (e.g., mo-signalling, mo-data, etc.).

The relay UE that receives the RRC connection establishment cause from the remote UE performs the RRC connection establishment procedure with a network based on the RRC connection establishment cause which is received in step S340.

In the embodiments above, it is described that the remote UE transmits the RRC connection establishment cause to the relay UE after the remote UE receives a notification for the RRC state of the relay UE or the RRC connection establishment cause request, but the present invention is not limited thereto. That is, the relay UE may transmit the cause value to the relay UE without receiving any notification for the RRC state of the relay UE or the RRC connection establishment cause request.

In addition, the RRC connection establishment cause received from the remote UE may be forwarded through a header/RRC of a new layer on MAC control element (CE)/(sub) header/RRC header/RLC layer or a header of a new layer on the RRC layer.

When the relay UE receives a plurality of cause values from a plurality of remote UEs, the relay UE may configure a cause value of the RRC connection establishment with the cause value having the highest priority among the plurality of cause values.

An example of the priority among the cause values may be as below.

(Priority) mt-access>mo-ExceptionData>Mo-signaling>MO-data>delay permission (non-priority)

2. Method 2

According to method 2, a relay UE may configure a new RRC connection establishment cause configured by the relay UE itself, and according to this, perform an RRC connection establishment procedure with a network. That is, in the case that the relay UE is in RRC_IDLE and a data transmission is requested from a remote UE, the relay UE may perform the RRC connection establishment procedure based on one of the cause values defined in Table 1 or the newly defined cause value. In the case that the newly defined cause value is used, the newly defined cause value may be indicated that the RRC connection establishment is for the remote UE.

Figure 10:
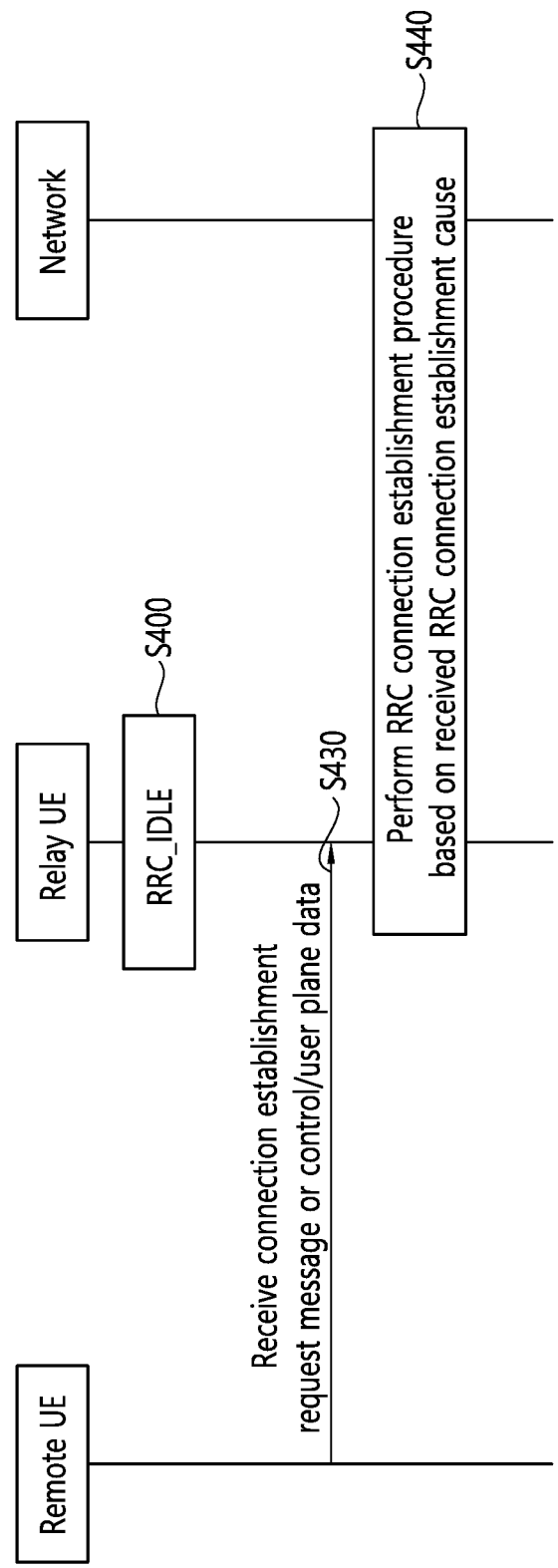
FIG. 10 illustrates a method for configuring an RRC connection establishment cause according to another embodiment of the present invention.

FIG. 10 illustrates a method for configuring an RRC connection establishment cause according to another embodiment of the present invention.

In step S400, a relay UE is in RRC_IDLE. In step S410, the relay UE receives a connection establishment request message for a connection establishment between a remote UE and the relay UE from the relay UE, or receives random control plane or user plane data from the remote UE. That is, for the ProSe UE-to-network relay, an RRC connection establishment procedure with a network is triggered.

In step S420, the relay UE performs the RRC connection establishment procedure with the network based on the previously defined RRC connection establishment cause or the RRC connection establishment cause which is newly defined for the ProSe UE-to-network relay. The newly defined RRC connection establishment cause may indicate that the RRC connection establishment is for the remote UE.

Figure 11:
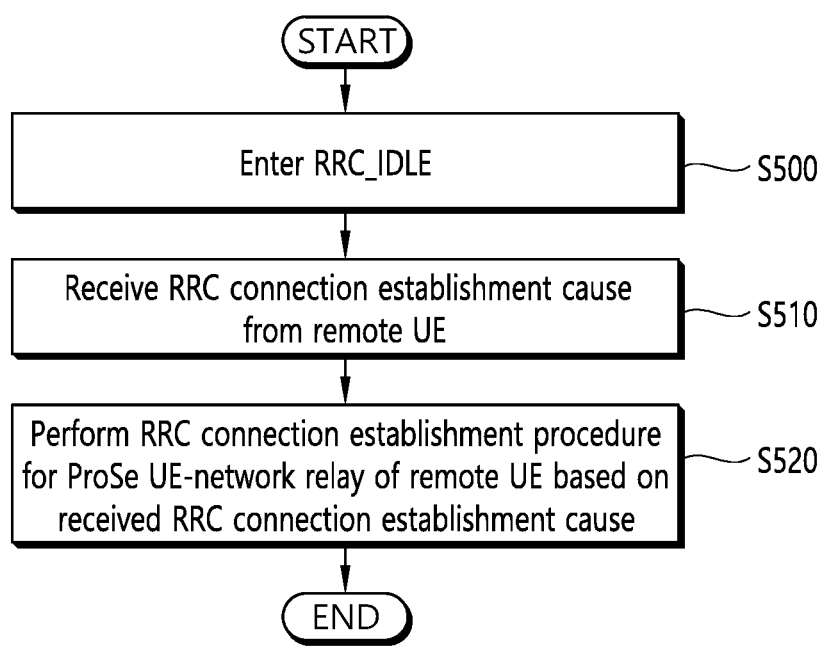
FIG. 11 illustrates a method for configuring an RRC connection establishment procedure according to an embodiment of the present invention.

FIG. 11 illustrates a method for configuring an RRC connection establishment procedure according to an embodiment of the present invention. The embodiment of FIG. 11 shows a method for configuring an RRC connection establishment cause by method 1 described above, and performing the RRC connection establishment procedure.

In step S500, a relay UE enters RRC_IDLE. In step S510, the relay UE receives the RRC connection establishment cause from a remote UE. In step S520, the relay UE performs the RRC connection establishment procedure for the ProSe UE-to-network relay of the remote UE based on the received RRC connection establishment cause.

Sidelink may be connected and established between the relay UE and the remote UE. In addition, after entering the RRC_IDLE state, an indicator for informing that an RRC state of the relay UE is changed may be transmitted to the remote UE.

The RRC connection establishment procedure may be triggered by receiving a connection establishment request message for a connection establishment between the relay UE and the remote UE or receiving control plane data or user plane data from the remote UE. The connection establishment request message may be received before the RRC connection establishment cause is received. In addition, after the connection establishment request message is received, an indicator indicating that the relay UE is in RRC_IDLE or a message requesting the RRC connection establishment cause may be transmitted to the remote UE. The control plane data or the user plane data may be received before receiving the RRC connection establishment cause. Alternatively, the control plane data or the user plane data may be received together with the RRC connection establishment cause. Alternatively, the control plane data or the user plane data may be received after the RRC connection establishment procedure is performed.

The RRC connection establishment cause may be a plurality of RRC connection establishment causes which are received from a plurality of remote UEs. The RRC connection establishment procedure may be performed by the RRC connection establishment cause having the highest priority among the plurality of RRC connection establishment causes. The RRC connection establishment cause having the highest priority may be "mt-access".

Figure 12:
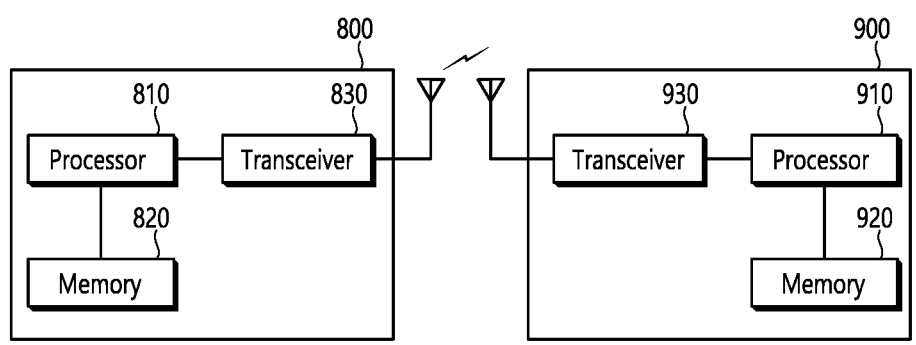
FIG. 12 shows a wireless communication system to implement an embodiment of the present invention.

FIG. 12 shows a wireless communication system to implement an embodiment of the present invention.

A relay UE 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A remote UE or a network node 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for performing a radio resource control (RRC) connection establishment procedure performed by a relay user equipment (UE) in a wireless communication system, the method comprising:
- entering an RRC idle (RRC_IDLE) state;
- receiving an RRC connection establishment cause from a remote UE;
- performing the RRC connection establishment procedure for proximity-based services (ProSe) UE-to-network relay of the remote UE based on the received RRC connection establishment cause, and
- transmitting information related to a changed RRC state of the relay UE to the remote UE, after entering the RRC_IDLE state.

2. The method of claim 1, wherein a sidelink is connected and established between the relay UE and the remote UE.

3. The method of claim 1, wherein the RRC connection establishment procedure is triggered by receiving from the remote UE a connection establishment request message for a connection establishment between the relay UE and the remote UE or receiving from the remote UE control plane data or user plane data.

4. The method of claim 3, wherein the connection establishment request message is received before the RRC connection establishment cause is received.

5. The method of claim 4, further comprising:
- transmitting information related to the relay UE which is in the RRC_IDLE state or a message requesting the RRC connection establishment cause to the remote UE, after the connection establishment request message is received.

6. The method of claim 3, wherein the control plane data or the user plane data is received before receiving the RRC connection establishment cause.

7. The method of claim 3, wherein the control plane data or the user plane data is received together with the RRC connection establishment cause.

8. The method of claim 3, wherein the control plane data or the user plane data is received after the RRC connection establishment procedure is performed.

9. The method of claim 1, wherein the RRC connection establishment cause is a plurality of RRC connection establishment causes which are received from a plurality of remote UEs.

10. The method of claim 9, wherein the RRC connection establishment procedure is performed by the RRC connection establishment cause having a highest priority among the plurality of RRC connection establishment causes.

11. The method of claim 10, wherein the RRC connection establishment cause having the highest priority is "mt-access".

12. A relay user equipment (UE) in a wireless communication system, the relay UE comprising:
- a memory;
- a transceiver; and
- a processor connected with the memory and the transceiver,
- wherein the processor is configured to:
- enter a radio resource control (RRC) idle (RRC_IDLE) state;
- control the transceiver to receive an RRC connection establishment cause from a remote UE;
- perform the RRC connection establishment procedure for proximity-based services (ProSe) UE-to-network relay of the remote UE based on the received RRC connection establishment cause, and
- transmit information related to a changed RRC state of the relay UE to the remote UE, after entering the RRC_IDLE state.

13. The method of claim 1, wherein the UE is in communication with at least one of a mobile terminal, a network, and/or autonomous vehicles other than the UE.

* * * * *